(12) United States Patent
Krisher

(10) Patent No.: US 7,390,278 B2
(45) Date of Patent: Jun. 24, 2008

(54) TORQUE-COUPLING DEVICE FOR FRONT-WHEEL-DRIVE TRANSAXLE UNIT

(75) Inventor: James A. Krisher, Fort Wayne, IN (US)

(73) Assignee: Dana Automotive Systems Group, LLC., Toledo, OH (US)

( * ) Notice: Subject to any disclaimer, the term of this patent is extended or adjusted under 35 U.S.C. 154(b) by 97 days.

(21) Appl. No.: 11/083,219

(22) Filed: Mar. 18, 2005

(65) Prior Publication Data

US 2006/0211532 A1 Sep. 21, 2006

(51) Int. Cl.
*F16H 48/30* (2006.01)
*F16H 48/06* (2006.01)
*F16H 48/20* (2006.01)

(52) U.S. Cl. .......................... 475/231; 475/150
(58) Field of Classification Search ................. 475/231, 475/150

See application file for complete search history.

(56) References Cited

U.S. PATENT DOCUMENTS

| | | | |
|---|---|---|---|
| 4,922,789 A * | 5/1990 | Aono et al. ..................... 475/86 |
| 4,976,347 A | 12/1990 | Sakakibara et al. | |
| 5,083,478 A | 1/1992 | Hiraiwa | |
| 5,106,349 A | 4/1992 | Botterill et al. | |
| 5,172,787 A | 12/1992 | Kobayashi | |
| 5,279,401 A | 1/1994 | Stall | |
| 5,350,340 A * | 9/1994 | Paul et al. ..................... 475/237 |
| 5,582,557 A * | 12/1996 | Dissett et al. ................. 475/231 |
| 5,609,219 A | 3/1997 | Watson et al. | |
| 5,954,150 A | 9/1999 | Miller et al. | |
| 6,000,488 A | 12/1999 | Atkinson | |
| 6,263,995 B1 | 7/2001 | Watson et al. | |
| 6,296,590 B1 | 10/2001 | Gassmann | |
| 6,398,686 B1 | 6/2002 | Irwin | |
| 6,533,699 B1 * | 3/2003 | Fett ............................. 475/231 |
| 6,554,732 B1 * | 4/2003 | Sommer ...................... 475/221 |
| 6,561,939 B1 * | 5/2003 | Knapke ....................... 475/150 |
| 6,592,487 B2 | 7/2003 | Gassmann | |
| 6,668,961 B2 | 12/2003 | Bowen et al. | |
| 6,698,565 B2 * | 3/2004 | Cool et al. .................... 192/94 |
| 7,004,873 B2 * | 2/2006 | Puiu ............................ 475/145 |
| 2002/0032096 A1 | 3/2002 | Gassmann | |
| 2005/0026732 A1 * | 2/2005 | Krisher et al. ................ 475/86 |

FOREIGN PATENT DOCUMENTS

DE 4202595 A1 * 8/1993

* cited by examiner

*Primary Examiner*—Tisha Lewis
(74) *Attorney, Agent, or Firm*—Berenato, White & Stavish

(57) ABSTRACT

A front-wheel-drive transaxle unit for a motor vehicle comprises a differential assembly having a differential mechanism disposed in a differential case and two opposite output shafts outwardly extending from the differential case and a torque-coupling device for selectively restricting differential rotation of the differential mechanism. The torque-coupling device includes a friction clutch assembly for selectively frictionally engaging and disengaging the differential case and one of the output shafts, and a selectively controllable clutch actuator assembly for selectively frictionally loading the friction clutch assembly. The clutch assembly includes at least one first member non-rotatably coupled to the differential case and at least one second member non-rotatably coupled to one of said output shafts. The torque-coupling device provides the differential assembly of the front-wheel-drive transaxle unit with both limited-slip and open differential capabilities.

19 Claims, 4 Drawing Sheets

US 7,390,278 B2

TORQUE-COUPLING DEVICE FOR FRONT-WHEEL-DRIVE TRANSAXLE UNIT

BACKGROUND OF THE INVENTION

1. Field of the Invention

The present invention relates to front wheel drive transaxle units for a motor vehicle, and more particularly to a front wheel drive transaxle unit having a differential assembly and a torque-coupling device providing the differential assembly with a limited slip capability.

2. Description of the Prior Art

Conventionally, differentials well known in the prior art, are arranged in a power transmission system of a motor vehicle to allow a pair of output axle shafts operatively coupled to an input shaft to rotate at differential speeds, thereby allowing the wheel associated with each output shaft to maintain traction with the road while the vehicle is turning. Such a device essentially distributes the torque provided by the input shaft between the output shafts. However, these types of differentials known in the art as an open differentials, i.e. a differential without clutches or springs, are unsuitable in slippery conditions where one wheel experiences a much lower coefficient of friction than the other wheel; for instance, when one wheel of a vehicle is located on a patch of ice or mud and the other wheel is on dry pavement. In such a condition, the wheel experiencing the lower coefficient of friction loses traction and a small amount of torque to that wheel will cause a "spin out" of that wheel. Since the maximum amount of torque, which can be developed on the wheel with traction, is equal to torque on the wheel without traction, i.e. the slipping wheel, the engine is unable to develop any torque and the wheel with traction is unable to rotate. Thus, the necessity for a differential, which limits the differential rotation between the output shafts to provide traction on slippery surfaces, is well known.

Limited-slip differentials are a relatively common option for rear-wheel-drive (RWD) vehicles, but are non-existent for front-wheel-drive (FWD) vehicles. The FWD vehicles typically utilize transaxles with open differentials.

Given the increased emphasis on high performance FWD vehicles in recent years, there is an increasing need for a controllable limited-slip differential for FWD transaxle units. Packaging the limited-slip differential in the FWD transaxle unit is extremely difficult due to space limitations, and the FWD transaxle housings cannot be economically redesigned to allow for more space.

Thus, what is needed is a FWD transaxle unit having a differential assembly capable to provide a limited-slip function only when required, i.e. limited-slip when one wheel has lost traction, and perform as an open differential when sufficient torque is developed.

SUMMARY OF THE INVENTION

The present invention provides an improved front-wheel-drive transaxle unit for a motor vehicle.

The front-wheel-drive transaxle unit of the present invention comprises a differential assembly having a differential mechanism disposed in a differential case and two opposite output shafts outwardly extending from the differential case and a torque-coupling device for selectively restricting differential rotation of the differential mechanism. The torque-coupling device includes a friction clutch assembly for selectively frictionally engaging and disengaging the differential case and one of the output shafts, and a selectively controllable clutch actuator assembly for selectively frictionally loading the friction clutch assembly. The clutch assembly includes at least one first member non-rotatably coupled to the differential case and at least one second member non-rotatably coupled to one of said output shafts. The torque-coupling device provides the differential assembly of the front-wheel-drive transaxle unit with both limited-slip and open differential capabilities.

Therefore, the front-wheel-drive transaxle unit in accordance with the present invention includes the torque-coupling device providing the differential assembly with the limited-slip function only when required, and performs as an open differential when sufficient torque is developed, thus enhancing FWD vehicle mobility, minimizing wheelspin, and providing the FWD vehicle with the mobility performance approaching that of an all-wheel-drive system at a fraction of the cost, while maintaining fuel economy of a two-wheel-drive motor vehicle. The present invention provides the FWD transaxle unit with the torque-coupling device in a compact packaging while avoiding major transaxle redesign.

BRIEF DESCRIPTION OF THE DRAWINGS

Other objects and advantages of the invention will become apparent from a study of the following specification when viewed in light of the accompanying drawings, wherein.

DETAILED DESCRIPTION OF PREFERRED EMBODIMENTS

The preferred embodiment of the present invention will now be described with the reference to accompanying drawings.

Figure 1:
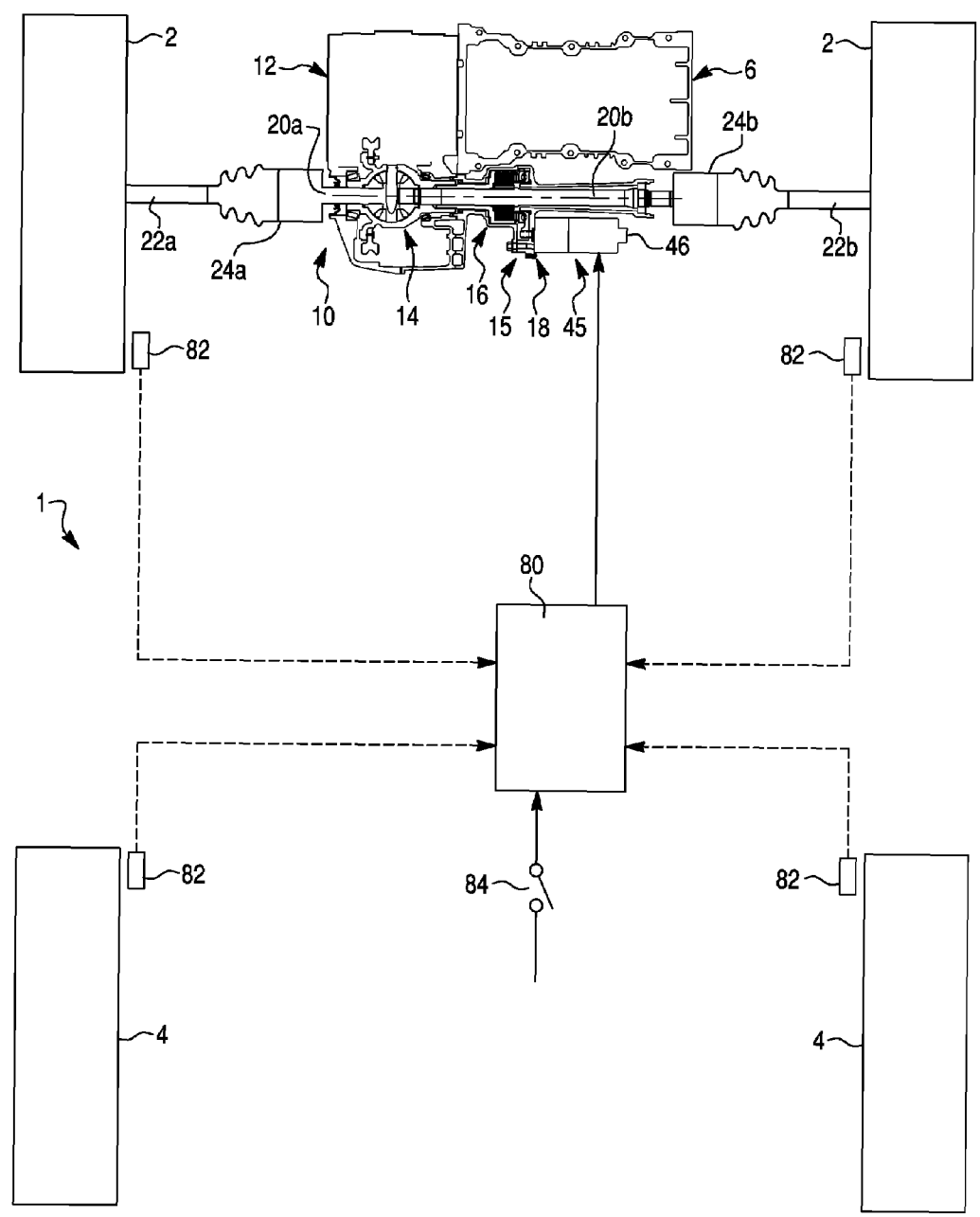
FIG. 1 is a schematic view showing a drivetrain of a front-wheel-drive vehicle including a front-wheel-drive transaxle.

FIG. 1 of the drawings schematically illustrates a layout of a motor vehicle drivetrain of a front-wheel-drive (FWD) motor vehicle 1 with a transversely mounted front engine suited for use with the present invention. The motor vehicle 1 has a pair of the front drive wheels 2, a pair of rear drive wheels 4 and a front-wheel-drive (FWD) transaxle unit 10 positioned between the two front wheels 2. The FWD transaxle unit 10 is operatively connected to a prime mover 6, such as an internal combustion engine, electric motor, etc. More specifically, the engine 6 has a transversely extending crankshaft 8 with its left-hand end splined to the FWD transaxle unit 10.

The FWD transaxle unit 10 is a drive setup in which a power transmission 12, a final drive, and a differential assembly 14 are combined into a single unit connected directly to the engine 6. The FWD transaxles are commonly used in front wheel drive motor vehicles. The power transmission 12 is commonly known in the art as a mechanical unit containing a manual or automatic change-speed gear system and associated actuating machinery. An output from the power transmission 12 is connected to the differential assembly 14. The differential assembly 14 is drivingly connected to left-hand and right-hand output drive shafts 20a and 20b, respectively. In turn, the output axle shafts 20a and 20b are drivingly coupled to left-hand and right-hand stub shafts 22a and 22b, respectively, driving the front wheels 2 through suitable coupling means, such as constant-velocity joints 24a and 24b.

As illustrated in FIG. 1, the FWD transaxle unit 10 further includes a friction clutch assembly 16 and a clutch actuator assembly 18 provided for selectively actuating the friction clutch assembly 16. The friction clutch assembly 16 in combination with the clutch actuator assembly 18 defines a torque-coupling device 15 for the differential assembly 14 for selectively restricting differential rotation of the output axle shafts 20a and 20b.

Figure 2:
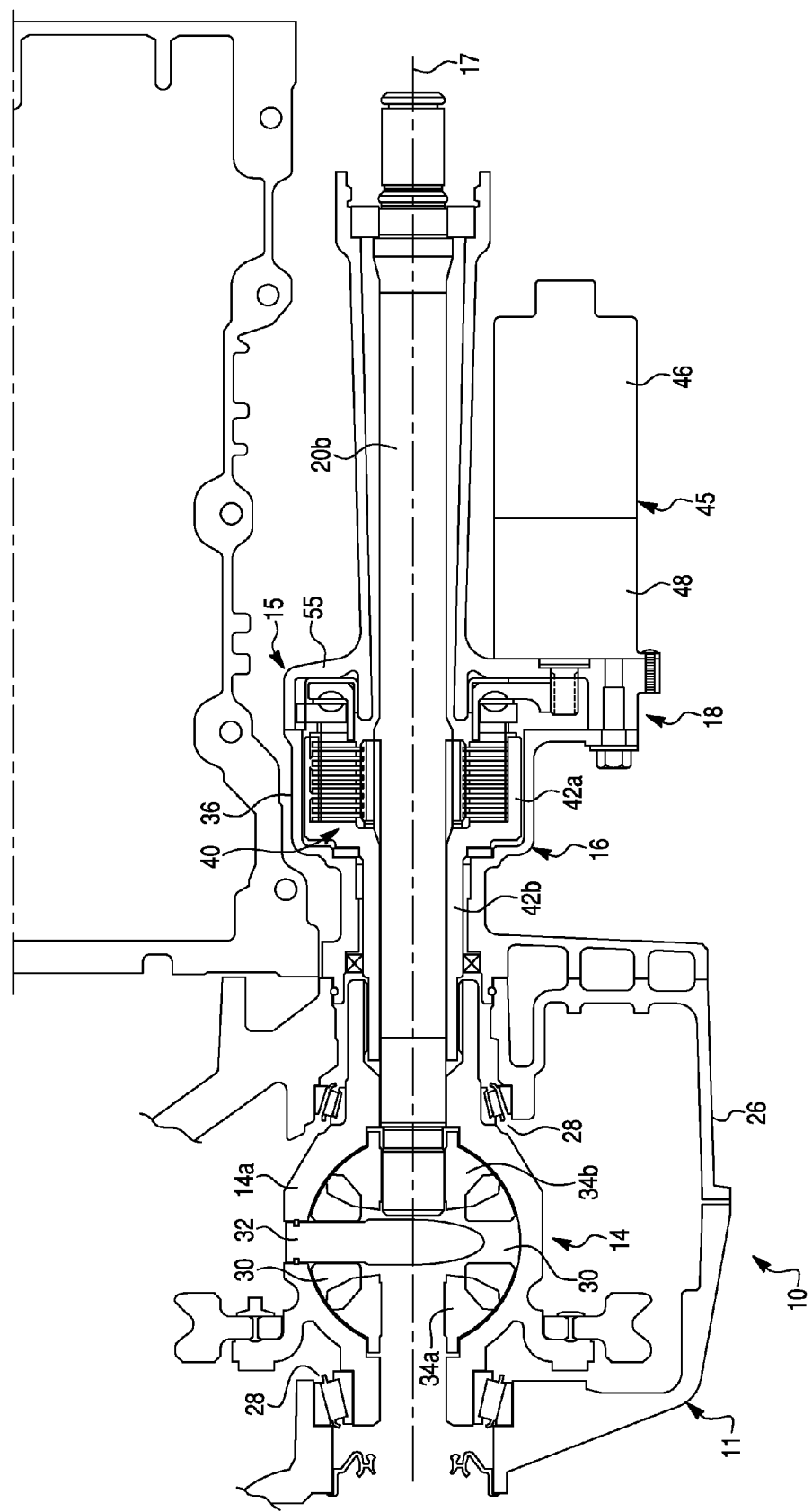
FIG. 2 is a partial sectional view of the front-wheel-drive transaxle in accordance with the present invention.

FIG. 2 of the drawings illustrates in detail the preferred arrangement of the differential assembly 14 in accordance with the present invention. Reference numeral 14a defines a differential case rotatably supported in a differential housing 26 through roller bearings 28, and defines an axis of rotation 17. Preferably, the differential housing 26 is an integral part of a transaxle housing 11.

The differential assembly 14 includes a differential mechanism having a set of pinion gears 30 rotatably supported on a pinion shaft 32 secured to the differential case 14a. The pinion gears 30 engage a pair of opposite side gears 34a and 34b adapted to rotate about the axis 17. The side gears 34a and 34b are splined to the output axle shafts 20a (not shown in FIG. 2) and 20b, respectively.

The torque-coupling device 15 is disposed outside the differential case 14a. Preferably, the friction clutch assembly 16 is disposed outside the differential housing 26 and within a clutch housing 36 secured to the differential housing 26. Such an arrangement of the torque-coupling device 15 minimizes the FWD transaxle unit redesign, tooling and manufacturing expenses.

The subject invention provides active control of a FWD transaxle differential while avoiding transaxle redesign for packaging.

Figure 3:
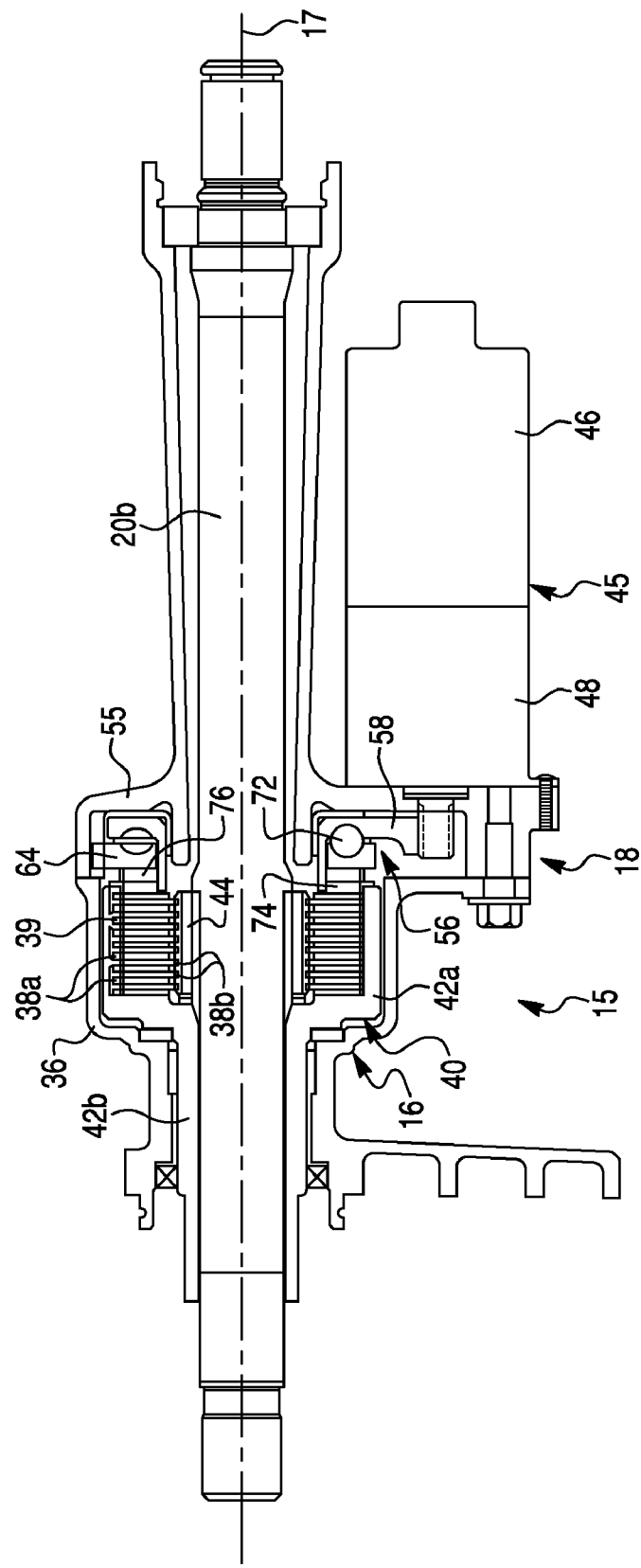
FIG. 3 is a sectional view of a friction clutch assembly and a clutch actuator assembly in accordance with the preferred embodiment of the present invention.

As illustrated in FIGS. 2 and 3, the friction clutch assembly 16, well known in the prior art, includes a clutch carrier member 40 and two sets of alternating outer, or first, friction members 38a and inner, or second, friction members 38b. The clutch carrier member 40 has a drum portion 42a housing the friction members 38a and 38b, and a sleeve portion 42b drivingly connected to the differential case 14a, preferably through a spline connection. Conventionally, an outer circumference of the outer friction members 38a is provided with projections that non-rotatably engage corresponding grooves 39 formed in an inner peripheral surface of the drum portion 42a of the clutch carrier member 40. Thus, the outer friction members 38a are axially slidably, but non-rotatably coupled to the differential case 14a. The inner friction members 38b are splined to an annular adaptor ring 44, which, in turn, is splined to the output axle shaft 20b, thus axially slidably, but non-rotatably coupling the inner friction members 38b to the output axle shaft 20b. As shown in FIG. 3, the friction members 38a and 38b are mounted substantially coaxially to the axis 17. In other words, the friction clutch assembly 16 is mounted substantially coaxially with the differential case 14a of the differential assembly 14 and is axially spaced relative thereto.

Figure 4:
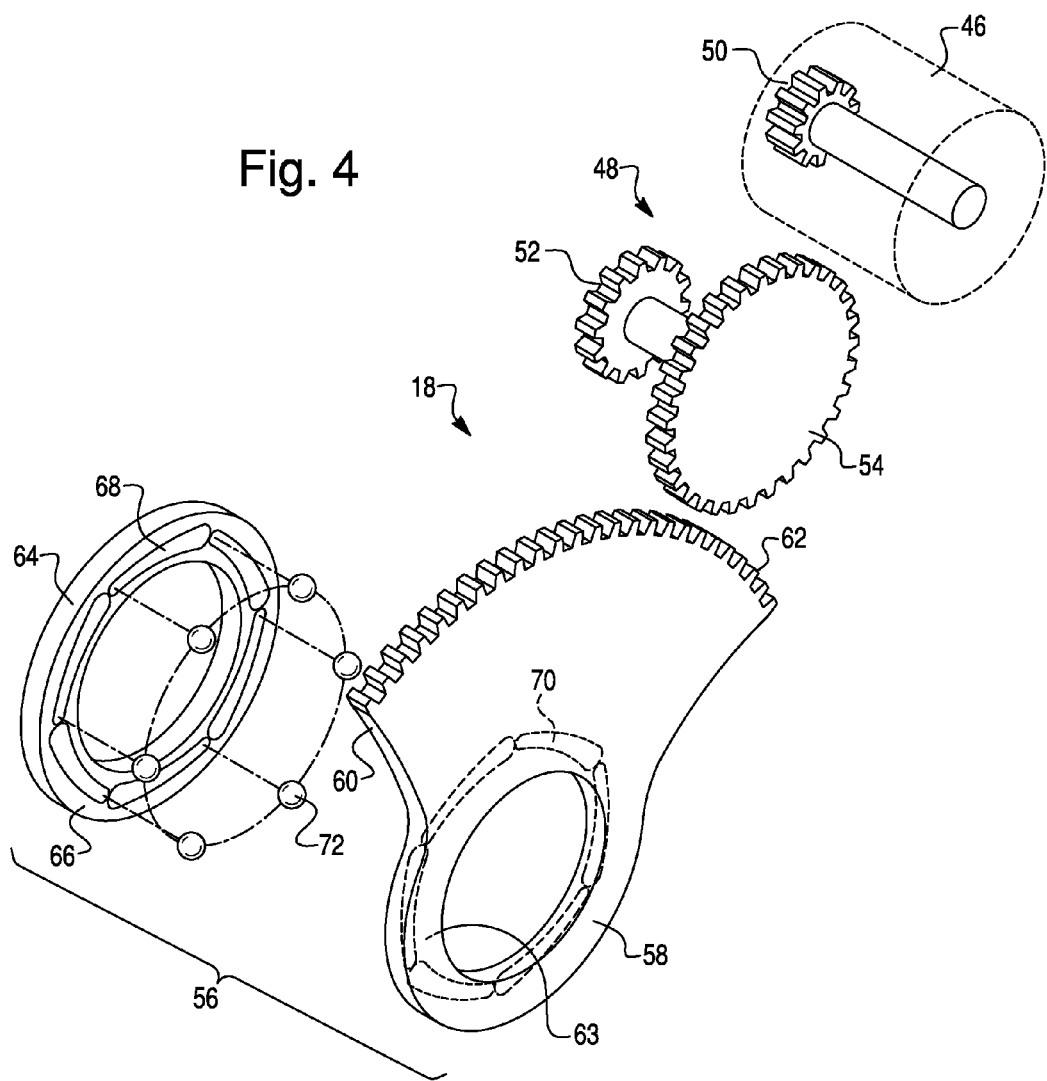
FIG. 4 is an exploded perspective view of the clutch actuator assembly in accordance with the preferred embodiment of the present invention.

The clutch actuator assembly 18 comprises a motor 46 and a ball-ramp clutch actuator 56 driven by the motor 46. Preferably, the motor 46 is in the form of a reversible electric motor, as the electric motor is compact and easily controllable. It will be appreciated that any other appropriate type of the actuator motor, such as hydraulic or pneumatic, are within the scope of the present invention. The motor 46 drives the ball-ramp actuator 56 preferably through a gear reduction module 48 including reduction gears 50, 52 and 54. As illustrated in FIG. 4, the gear 50 is driven by the motor 46, while the gears 52 and 54 are driven by the gear 50. The motor 46 in combination with the gear reduction module 48 defines a rotary drive device 45. The ball-ramp actuator 56 is disposed within an actuator housing 55 securely attached to the clutch housing 36. In turn, the gear reduction module 48 along with the motor 46 is mounted to the actuator housing 55.

The preferred embodiment the ball-ramp clutch actuator 56 of the actuator assembly 18 of the present invention, illustrated in detail in FIGS. 3 and 4, includes an actuating ring 58, a pressure collar 64 and a plurality of rolling members, such as balls 72, engaging opposed circumferentially extending recesses of variable axial depth therein. The actuating ring 58 has a radially extended arcuate portion 60 formed with external gear teeth 62 meshing with teeth of the reduction gear 54 so that the rotation of the motor 46 causes the angular displacement of the actuating ring 58, preferably less than 180°. Furthermore, the pressure collar 64 is provided to apply an axial force to a pressure plate 74 in order to load the friction clutch assembly 16. The pressure collar 64 is non-rotatably mounted to the actuator housing 55, while capable to move axially.

As further illustrated in the FIG. 4, an annular radial surface 66 of the pressure collar 64 facing the actuating ring 58, is formed with a set of circumferentially extending grooves 68 of varying axial depth, facing complementary grooves 70 formed on an opposite annular surface 63 of the actuating ring 58, whose depth varies in the opposite circumferential sense. A corresponding number of the balls 72 disposed between the pressure collar 64 and the actuating ring 58, one in each pair of the facing grooves 68 and 70. The cooperative surfaces 63 and 66 provided on opposite sides of the actuating ring 58 and the pressure collar 64, respectively, and the rolling members 72 disposed therebetween define a pressure collar actuator of the ball-and-ramp actuator 56.

Alternatively, a cam disc actuator including cooperative cam surfaces (not shown) provided on opposite sides of the actuating ring 58 and the pressure collar 64, may be used as the pressure collar actuator. It will be appreciated that any other types of the pressure collar actuators known in the prior art may be employed.

It will be appreciated that when the motor 46 moves the actuating ring 58 angularly relative to the pressure collar 64, the pressure collar 64 moves axially and causes the pressure plate 74 to frictionally load the clutch assembly 16. The axial movement of the pressure collar 64 is transmitted to the pressure plate 74 engaging the friction members 38a and 38b, through an axial thrust bearing 76. The axial thrust bearing 76 is provided between the pressure collar 64 and the pressure plate 74 to reduce the friction as the pressure plate 74 rotates about the axis 17.

As further illustrated in FIG. 1, the electric motor 46 of the clutch actuator assembly 18, thus the differential assembly 14, is controlled by an electronic control unit (ECU) 80. The control is carried out by judging vehicle running conditions according to at least one vehicle parameter, including but not limited to wheel speeds and a vehicle brake application inputted into the ECU 80 from wheel speed sensors 82 and a brake switch 84. Such an arrangement of the FWD transaxle unit 10 allows the torque capacity of the clutch assembly 16 to be actively controlled electronically and to be engaged independent of wheel or vehicle speeds.

As a result, the actuator assembly 18 selectively controllable by the ECU 80 is provided for axially displacing the pressure plate 74 in order to load the friction clutch assembly 16 when needed, thus providing the differential assembly 14 with a limited-slip function. On the other hand, when the clutch assembly 16 is not actuated, the differential assembly 14 of the present invention provides an open differential.

Alternatively, the torque-coupling device 15 can be attached to an all-wheel-drive (AWD) transaxle unit (not shown) with virtually no transaxle modifications, other than one additional output shaft. Transaxles designed for AWD systems include a minor revision for Power Takeoff Unit (PTU) adaptation. By utilizing the AWD transaxle unit, a differential control device can be attached in place of the PTU to provide active torque control between the differential case and one output shaft.

Therefore, the FWD transaxle unit in accordance with the present invention represents a novel arrangement of the FWD transaxle unit having a differential assembly and a torque-coupling device providing the differential assembly with a limited-slip capability. The differential assembly of the FWD transaxle unit in accordance with the present invention provides the limited-slip function only when required, and performs as an open differential when sufficient torque is developed, thus enhancing FWD vehicle mobility, minimizing wheelspin, and providing the FWD vehicle with the mobility performance approaching that of an all-wheel-drive system at a fraction of the cost, while maintaining fuel economy of a two-wheel-drive motor vehicle. The present invention provides the FWD transaxle unit with the torque-coupling device in a compact packaging while avoiding major transaxle redesign.

The foregoing description of the preferred embodiments of the present invention has been presented for the purpose of illustration in accordance with the provisions of the Patent Statutes. It is not intended to be exhaustive or to limit the invention to the precise forms disclosed. Obvious modifications or variations are possible in light of the above teachings. The embodiments disclosed hereinabove were chosen in order to best illustrate the principles of the present invention and its practical application to thereby enable those of ordinary skill in the art to best utilize the invention in various embodiments and with various modifications as are suited to the particular use contemplated, as long as the principles described herein are followed. Thus, changes can be made in the above-described invention without departing from the intent and scope thereof. It is also intended that the scope of the present invention be defined by the claims appended thereto.

What is claimed is:

1. A front-wheel-drive transaxle unit for a motor vehicle, said front wheel drive transaxle unit comprising:
    a power transmission operatively connected to a prime mover;
    a differential assembly drivingly connected to said power transmission and having a differential mechanism disposed in a differential case and two opposite output shafts outwardly extending from said differential case, said output shafts drivingly connected to front wheels of said motor vehicle;
    a differential housing rotatably supporting said differential assembly therewithin; and
    a torque-coupling device for selectively restricting differential rotation of said differential mechanism, said torque-coupling device including:
        a friction clutch assembly disposed outside said differential case for selectively frictionally engaging and disengaging said differential case and one of said output shafts, said clutch assembly comprising at least one first member non-rotatably coupled to said differential case and at least one second member non-rotatably coupled to one of said output shafts; and
        a selectively controllable ball-ramp clutch actuator assembly for selectively frictionally loading said friction clutch assembly;
    said friction clutch assembly being disposed outside said differential housing;
    said power transmission, said differential assembly and said torque-coupling device being combined into a single unit connected directly to said prime mover.

2. The front-wheel-drive transaxle unit as defined in claim 1, wherein said torque-coupling device is mounted about one of said output shafts.

3. The front-wheel-drive transaxle unit as defined in claim 1, further comprising a clutch housing rotatably supporting said friction clutch assembly therewithin; said clutch housing is secured to said differential housing.

4. The front-wheel-drive transaxle unit as defined in claim 1, wherein said at least one first member and said at least one second member are mounted substantially coaxially with said differential case of said differential assembly.

5. The front-wheel-drive transaxle unit as defined in claim 1, wherein said friction clutch assembly includes a clutch carrier member housing said at least one first member and said at least one second member; said clutch carrier member non-rotatably couples said differential case to said at least one first member.

6. The front-wheel-drive transaxle unit as defined in claim 1, wherein said ball-ramp clutch actuator assembly comprising:
    a rotary drive device;
    an actuating ring driven by said rotary drive device;
    a pressure collar operatively associated with said actuating ring; and
    a pressure collar actuator for axially displacing said pressure collar in response to the angular movement of said actuating ring for frictionally loading said friction clutch assembly.

7. The front-wheel-drive transaxle unit as defined in claim 6, wherein said actuating ring is rotatable along a circumferential path of less than 180°.

8. The front-wheel-drive transaxle unit as defined in claim 6, wherein said rotary drive device including a motor and a gear reduction module.

9. The front-wheel-drive transaxle unit as defined in claim 8, wherein said motor is a reversible electric motor.

10. The front-wheel-drive transaxle unit as defined in claim 6, wherein said pressure collar actuator is a ball-and-ramp actuator including cooperative surfaces provided on opposite sides of said actuating ring and said pressure collar and rolling members disposed therebetween.

11. The front-wheel-drive transaxle unit as defined in claim 6, wherein said pressure collar actuator is a cam disc actuator including cooperative cam surfaces provided on opposite sides of said actuating ring and said pressure collar.

12. The front-wheel-drive transaxle unit as defined in claim 6, further comprising an actuator housing accommodating therewithin said actuating ring, said pressure collar and said pressure collar actuator.

13. The front-wheel-drive transaxle unit as defined in claim 12, further comprising a differential housing rotatably supporting said differential assembly therewithin, and wherein said friction clutch assembly is disposed outside said differential housing.

14. The front-wheel-drive transaxle unit as defined in claim 13, wherein said actuator housing is secured to said clutch housing; and wherein said rotary drive device is mounted to said actuator housing.

15. The front-wheel-drive transaxle unit as defined in claim 1, further comprising an electronic control unit provided for selectively controlling said clutch actuator assembly based on vehicle running condition according to at least one vehicle parameter.

16. The front-wheel-drive transaxle unit as defined in claim 15, wherein said at least one vehicle parameter includes a vehicle wheel speed.

17. The front-wheel-drive transaxle unit as defined in claim 15, wherein said at least one vehicle parameter includes a vehicle brake application.

18. A front-wheel-drive transaxle unit for a motor vehicle, said front wheel drive transaxle unit comprising:
 a differential housing;
 a power transmission operatively connected to a prime mover;
 a differential assembly drivingly connected to said power transmission and having a differential mechanism disposed in a differential case rotatably supported within said differential housing and two opposite output shafts outwardly extending from said differential case, said output shafts being drivingly connected to front wheels of said motor vehicle;
 a torque-coupling device disposed outside said differential housing for selectively restricting differential rotation of said differential mechanism, said torque-coupling device including:
  a friction clutch assembly rotatably supported within a clutch housing for selectively frictionally engaging and disengaging said differential case and one of said output shafts, said clutch housing is secured to said differential housing, said clutch assembly comprising a plurality of first members non-rotatably coupled to said differential case through a clutch carrier member and a plurality of second members non-rotatably coupled to one of said output shafts, said first and second members mounted substantially coaxially with said differential case; and
  a selectively controllable clutch actuator assembly for selectively frictionally loading said friction clutch assembly, said clutch actuator assembly including a reversible electric motor and a ball-ramp clutch actuator driven by said electric motor, said ball-ramp clutch actuator disposed in an actuator housing secured to said clutch housing, said electric motor mounted to said actuator housing; and
 an electronic control unit provided for selectively controlling said clutch actuator assembly based on vehicle running condition according to at least one vehicle parameter;
 said power transmission, said differential assembly and said torque-coupling device being combined into a single unit connected directly to said prime mover.

19. A front-wheel-drive transaxle unit for a motor vehicle, said front wheel drive transaxle unit comprising:
 a power transmission operatively connected to a prime mover;
 a differential assembly drivingly connected to said power transmission and having a differential mechanism disposed in a differential case and two opposite output shafts outwardly extending from said differential case, said output shafts drivingly connected to front wheels of said motor vehicle;
 a differential housing rotatably supporting said differential assembly therewithin; and
 a torque-coupling device for selectively restricting differential rotation of said differential mechanism, said torque-coupling device including:
  a friction clutch assembly for selectively frictionally engaging and disengaging said differential case and one of said output shafts, said clutch assembly comprising at least one first member non-rotatably coupled to said differential case and at least one second member non-rotatably coupled to one of said output shafts; and
  a selectively controllable clutch actuator assembly for selectively frictionally loading said friction clutch assembly;
 said clutch actuator assembly comprises a rotary drive device including a reversible electric motor;
 said friction clutch assembly being disposed outside said differential housing;
 said power transmission, said differential assembly and said torque-coupling device being combined into a single unit connected directly to said prime mover.

* * * * *